United States Patent
Heo et al.

(10) Patent No.: US 8,885,646 B2
(45) Date of Patent: Nov. 11, 2014

(54) APPARATUS AND METHOD FOR BALANCING LOAD ACROSS MULTIPLE PACKET PROCESSING ENGINES

(75) Inventors: Hwan-Jo Heo, Daejeon-si (KR);
Nam-Seok Ko, Daejeon-si (KR);
Woo-Sug Jung, Daejeon-si (KR);
Sung-Jin Moon, Daejeon-si (KR);
Sung-Kee Noh, Daejeon-si (KR);
Jong-Dae Park, Daejeon-si (KR);
Byung-Ho Yae, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 185 days.

(21) Appl. No.: 13/323,178

(22) Filed: Dec. 12, 2011

(65) Prior Publication Data
US 2012/0147891 A1   Jun. 14, 2012

(30) Foreign Application Priority Data

Dec. 13, 2010   (KR) .......................... 10-2010-0127001

(51) Int. Cl.
*H04L 12/28*   (2006.01)
*H04L 12/803*   (2013.01)

(52) U.S. Cl.
CPC ................................... *H04L 47/125* (2013.01)
USPC ......................................................... 370/392

(58) Field of Classification Search
None
See application file for complete search history.

(56) References Cited

U.S. PATENT DOCUMENTS

| 6,853,638 | B2 | 2/2005 | Cohen | |
|---|---|---|---|---|
| 6,854,117 | B1 | 2/2005 | Roberts | |
| 2003/0133514 | A1* | 7/2003 | Lais et al. | 375/260 |
| 2006/0101159 | A1* | 5/2006 | Yeh et al. | 709/246 |
| 2006/0209688 | A1* | 9/2006 | Tsuge et al. | 370/229 |
| 2010/0284271 | A1* | 11/2010 | Ferguson et al. | 370/230 |

* cited by examiner

*Primary Examiner* — Chirag Shah
*Assistant Examiner* — Rina Pancholi
(74) *Attorney, Agent, or Firm* — Staas & Halsey LLP

(57) ABSTRACT

A distributed packet processing apparatus capable of distributing packet load across a plurality of packet processing engines is provided. The distributed packet processing apparatus includes a plurality of processing engines each configured to process allocated packets, a first tag generating unit configured to allocate an input packet to a processing engine, which has a processing engine index corresponding to a tag index for the input packet, among the plurality of processing engines, a second tag generating unit configured to calculate a tag index for an output packet, and an index conversion unit configure to convert the tag index for the output packet to one processing engine index among a plurality of processing indexes for the plurality of the processing engines and allocates the output packet to a processing engine having the one processing engine index such that loads are distributed among the plurality of processing engines.

18 Claims, 5 Drawing Sheets

FIG. 2

| PE INDEX | INPUT PACKET PROCESSING LOAD | OUTPUT PACKET PROCESSING LOAD |

~140

APPARATUS AND METHOD FOR BALANCING LOAD ACROSS MULTIPLE PACKET PROCESSING ENGINES

CROSS-REFERENCE TO RELATED APPLICATION

This application claims the benefit under 35 U.S.C. §119(a) of Korean Patent Application No. 10-2010-0127001, filed on Dec. 13, 2011, the disclosure of which is incorporated by reference in its entirety for all purposes.

BACKGROUND

1. Field

The following description relates to a computer network, and more particularly, to a load balancing when processing packets in a multi-processor system.

2. Description of the Related Art

Networking devices, for example, routers, switches, firewalls, and middle boxes, have evolved to accommodate a variety of functionalities at a wide bandwidth. Multi-core processors or processor arrays that not only provide some level of programmability to meet the functional requirement but also leverage parallelism to meet the performance requirement have been widely equipped in such devices. Efforts to maximize and improve parallelism has been developed into a scheme of dividing an input packet stream to flows, that is, independent sets of packets that do not require synchronization or context sharing with respect to other groups.

A flow distribution model using hash tag is one of the most widely used approach of the above scheme. A tag value is calculated for each of ingress or egress input packets by use of a general hash function, and the calculated tag value is utilized as an index of a core or a processor such that the packet is forwarded to a core or a processor having the corresponding index. The uniformity of hash functions provides that flows are distributed across the processing engines with roughly the same probability; the processing engines are evenly balanced in terms of the number of flows.

In balancing the flow count in a networking device, there is a pitfall of inconsistency between the number of flows and the number of packets belonging to the flow. That is, even if the processing engines are completely balanced in term of the flow count, the packet count or the byte count may be severely unbalanced across the processing engines to which packets are allocated.

Traffic bursts occurring in a short time scale, such as RTT (Round Trip Times), that is, traffic bursts occurring due to load imbalance in the processing engine during several hundred milliseconds or less can be effectively handled using a packet buffer with tolerance of some delay or can be prevented by overprovisioning the capacity of processing engines. However, in order to cope with persistent overload due to the load imbalance occurring in a non-stationary manner in a large time scale, an alternative to the distribution scheme is required.

The extent of load imbalance can be also greater in a large time scale than a small time scale. The distribution of flow size, which is known to be heavy-tailed or Pareto-like, has a heavier tail than the distribution of flow rate, which is often observed to be consistent to the Lognormal distribution. The distribution of packet load to be processed at each engine in a time window larger than a general flow lifetime approximates to the distribution of flow size while the distribution of packet load in a small time window approximates to the distribution of flow rate. As a few very large flows, account for a significant portion of the entire traffic, the flow count based balancing does not implicate the number of packets or bytes being roughly balanced.

SUMMARY

The following description relates to a method and apparatus capable of balancing packet load across multiple packet processing engines.

In one general aspect, there is provided a distributed packet processing apparatus including: a plurality of processing engines each configured to process allocated packets; a first tag generating unit configured to allocate an input packet to a processing engine, which has a processing engine index corresponding to a tag index for the input packet, among the plurality of processing engines; a second tag generating unit configured to calculate a tag index for an output packet; and an index conversion unit configured to convert the tag index for the output packet to one processing engine index among a plurality of processing indexes for the plurality of the processing engines and allocates the output packet to a processing engine having the one processing engine index such that loads are distributed among the plurality of processing engines.

In another general aspect, there is provided a distributed packet processing apparatus including: a plurality of processing engines each configured to process allocated packets; a first tag generating unit configured to allocate an output packet to a processing engine, which has a processing engine index corresponding to a tag index for the output packet, among the plurality of processing engines; a second tag generating unit configured to calculate a tag index for an input packet; and an index conversion unit configure to convert the tag index for the input packet to one processing engine index among a plurality of processing indexes for the plurality of the processing engines and allocates the input packet to a processing engine having the one processing engine index such that loads are distributed among the plurality of processing engines.

In another general aspect, there is provided a distributed packet processing method for performing a distributed processing on input packets and output packets by use of a plurality of processing engines, the method including: converting a tag index for one of the input packet and the output packet to one processing engine index among a plurality of processing indexes for the plurality of the processing engines such that loads are distributed among the plurality of processing engines; and allocating the one of the input packet and the output packet to a processing engine having the one processing engine index.

In another general aspect, there is provided a distributed packet processing apparatus including: an index conversion mapping calculation unit configured to calculate index conversion mapping information, which is used to convert a tag index for one of an input packet and an output packet to one of a plurality of processing engine indexes for a plurality of processing engines, by referring to a processing engine information table including input packet processing load information and output packet processing load information for each of the plurality of processing engine such that loads are distributed among the plurality of processing engines; and a packet allocation unit configured to convert a tag index for one of the input packet and the output packet to a processing engine index of the plurality of processing engine indexes according to the calculated index conversion mapping information, and allocate the one of the input packet and the output packet to a processing engine having the processing engine index.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 2 illustrates an example of the configuration of a processing engine information table.

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, examples will be described with reference to accompanying drawings in detail.

Figure 1:
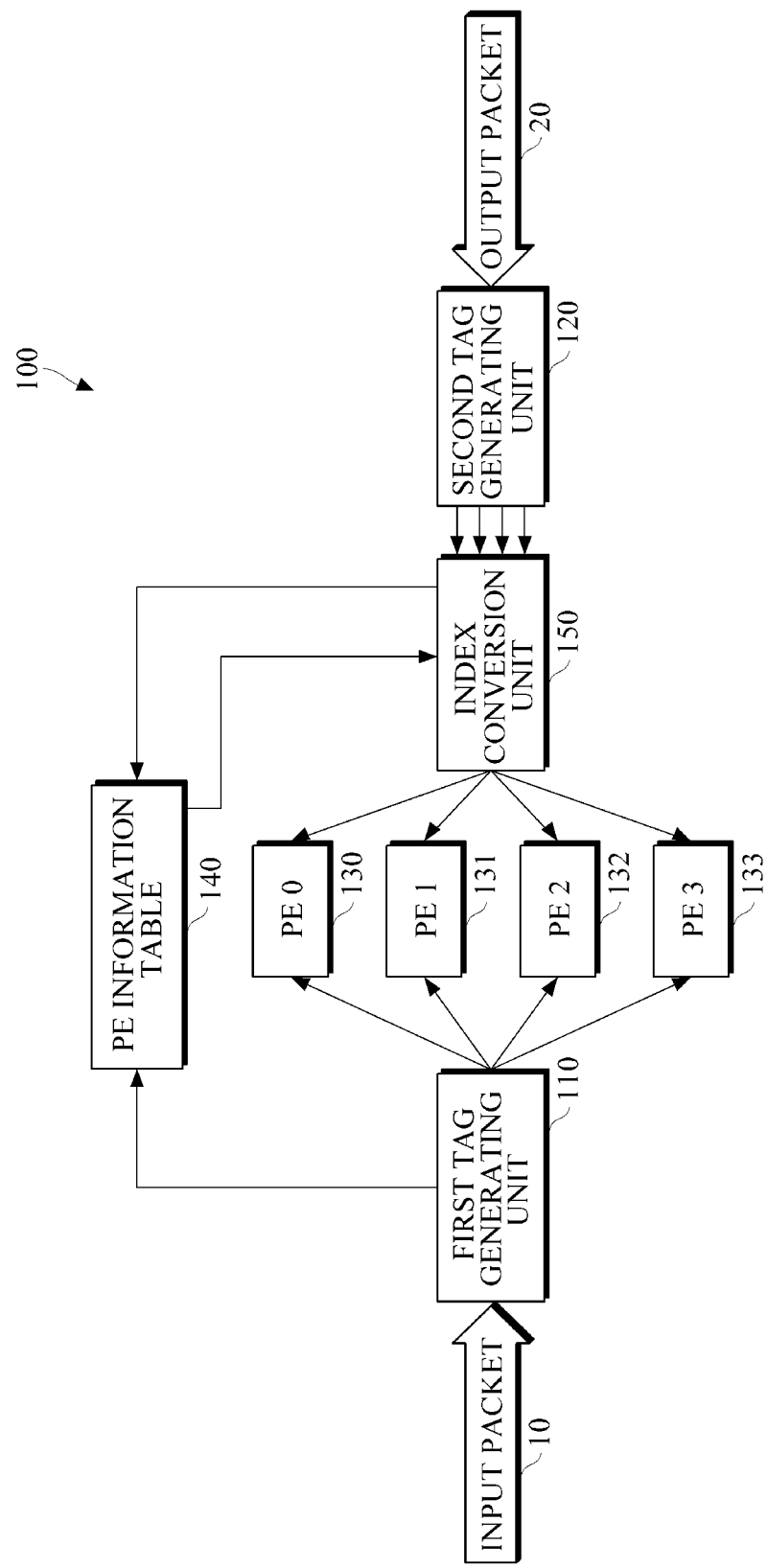
FIG. 1 illustrates an example of the configuration of a distributed packet processing apparatus.

FIG. 1 illustrates an example of the configuration of a distributed packet processing apparatus.

A distributed packet processing apparatus 100 includes a first tag generating unit 110, a second tag generating unit 120, a plurality of processing engines (PE) 130, 131, 132 and 133, a processing engine information table 140 and an index conversion unit 150. Networking devices such as routers, switching hubs, and security firewalls may have the distributed packet processing apparatus 100.

The distributed packet processing apparatus 100 operates such that load is balanced among the processing engines 130, 131, 132 and 133 that are configured to process input packets 10 and output packets 20. The input packet 10 represents a packet inputted from a network through an input port (not shown) of the distributed packet processing apparatus 100, and the output packet 20 represents a packet, which needs to be processed through the processing engines 130, 131, 132 and 133 before outputting to the network through an output port (not shown) of the distributed packet processing apparatus 100. Each of the input packet 10 and the output packet 20 is identified by its transmission directions, and may represent one or more packets.

The first tag generating unit 110 generates a tag index by applying a hash function to information about the input packet 10. For example, the first tag generating unit 110 may generate a tag index (or a tag value) by applying a hash function to the source IP address, destination IP address, source port address, destination port address and protocol type value that are included in the header of the input packet 10. The tag index may be generated to correspond to a processing engine index of one of the processing engines 130, 131, 132 and 133. The first tag generating unit 110 allocates the input packet 10 to a processing engine having the processing engine index, which corresponds to the tag index of the input packet 10, among the processing engines 130, 131, 132, and 133.

The second tag generating unit 120 generates a tag index by applying a hash function to information about the output packet 20, and transfers the generated tag index to the index conversion unit 150.

The processing engines 130, 131, 132 and 133 perform packet processing on the input packet 10 allocated by the first tag generating unit 110 and the output packet 20 allocated by the index conversion unit 150. In FIG. 1, the distributed packet processing apparatus 100 includes four processing engines 130, 131, 132 and 133, but the number of the processing engines included in the distributed packet processing apparatus is not limited thereto.

The processing engine information table 140 stores input packet processing load information and output packet processing load information for each of the processing engines 130, 131, 132 and 133. A measure of processor availability, for example, the CPU utilization may be used as the input and output packet processing load information. Alternatively, packet count and byte information that are processed for a predetermined period of time may be used as the input packet processing load information and the output packet processing load information. For example, the number of packets being processed in a unit time, often measured by PPM (Packets Per Minute), and the number of bytes being processed for a predetermined period of time, measured by BPM (Bytes Per Minute), may be used as the input packet processing load information and the output packet processing load information. The input packet processing load information and the output packet processing load information may be periodically updated.

The index conversion unit 150 converts a tag index of an output packet which is calculated by the second tag generating unit 120 to a processing engine index among a plurality of processing indexes for the plurality of the engines 130, 131, 132 and 133. The index conversion unit 150 converts a tag index to a processing engine index by use of an index conversion mapping table (not shown) including a predetermined information, which is used to convert tag indexes of output packets to processing engine indexes. The predetermined information is set such that loads are maximally distributed among the processing engines 130, 131, 132 and 133.

In FIG. 1, a tag index of the input packet 10 calculated in the first tag generating unit 110 may be used as a processing engine index such that the input packet 10 is allocated to a processing engine having the tag index of the input packet 10. However, a tag index of the output packet 20 may not be used as a processing engine index as it is, and a processing engine index may be extracted based on an index conversion mapping through the index conversion unit 150.

The index conversion 150 shown in FIG. 1 is connected to a position at which the output packet 20 is processed, that is, connected to the second tag generating unit 150. However, according to another example, the index conversion 150 may be connected to the first tag generating unit 110. That is, the index conversion unit 150 may be attached to one of an input packet processing path or an output packet processing path. For example, in distributing loads among the processing engines 130, 131, 132 and 133, a tag index for an input packet may be converted to one of a plurality of processing engine indexes, and a tag index for an output packet may be used as a processing engine index value without conversion in processing output packets. Hereinafter, the following description will be made in relation to the index conversion unit 150 as being attached to the output packet processing path.

The index conversion unit 150 may perform an index conversion mapping in a manner to maximally balance the packet processing loads across the processing engines 130, 131, 132 and 133. It may be assumed that N processing engines exist and an $i^{th}$ processing engine, which is configured to process packets with the tag index of 'i', has the $j^{th}$ highest input packet processing load. In order to maximally balance the packet processing loads, the index conversion unit 150 performs an index conversion mapping such that the $i^{th}$ processing engine has the $N-j^{th}$ highest output packet processing load. In this manner, a processing engine having the highest load in processing input packets has the smallest load in processing output packets. Similarly, a processing engine having the second highest load in processing input packets has the second smallest load in processing output packets.

FIG. 2 illustrates an example of the configuration of a processing engine information table As shown in FIGS. 1 and 2, the processing engine information table 140 is used for index conversion based on load of the processing engines 130, 131, 132 and 133. The processing engine information table 140 may include input packet processing load information and output packet processing load information for each of the processing engines 130, 131, 132 and 133. Accordingly, if the distributed packet processing apparatus includes N processing engines, information about the processing engines may include load information for each of the processing engines.

The input packet processing load and the output packet processing load for each of the processing engines may be periodically updated. To this end, the first tag generating unit 110 periodically measures input packet processing load for each of the processing engines 130, 131, 132 and 133 for a predetermined period of time while allocating input packets to the processing engines 130, 131, 132 and 133 based on the tag index of the input packet, and updates the processing engine information table 140 by use of information about the measured input packet processing load. Alternatively, an index conversion mapping is performed on tag indexes for output packets, and then the output packets are allocated according to the index conversion mapping while the output packet processing load is periodically being measured for each of the processing engines 130, 131, 132 and 133, and finally the processing engine information table 140 is updated by use of the measured output packet processing load.

According to another example, the processing engines 130, 131, 132 and 133 count respective packets that are processed by a corresponding engine among the processing engines 130, 131, 132 and 133, and update input packet load information and output packet information for each of the processing engines 130, 131, 132 and 133.

In addition, if at least one of the input packet processing load information and the output packet processing load information of the processing engine information table 140 is updated, the index conversion unit 150 performs an index conversion mapping, which changes information about converting a tag index for the output packet to a processing engine index of a processing engine index, again by use of the processing engine information table 140, and it is determined whether the processing engine index, which is mapped to the tag index of the output packet, needs to be changed. For example, the index conversion unit 150 calculates a load for each of the processing engines by use of the input packet processing load information and the output packet processing load information, and compares the calculated load with a threshold value, which is determined to an overload, thereby determining whether the index conversion mapping needs to be newly set. The threshold value may be set to vary depending on each processing engine.

Determination of load imbalance degree or overload of the processing engines 130, 131, 132 and 133 is not limited to the above scheme using an absolute criteria value and may be implemented with various schemes. For example, a relative value, such as a ratio of load of the most highly loaded engine to load of the least loaded engine, may be used.

In addition, the index conversion unit 150 may periodically perform the index conversion mapping, which is used to change information about converting the tag index of the output packet to the processing engine index. The period for the index conversion mapping may be different in different examples. The index conversion unit 150 may more evenly distribute loads across the processing engines 130, 131, 132 and 133 with a shorter period between index conversion mapping updates. However, in consideration of the need for load balancing in a large time scale, the index conversion unit 150 may perform the index conversion mapping by use of a coarse timer at a period of several seconds. Unless the performance degradation impaired by frequent updates is significant, the index conversion unit 150 may perform load balancing by use of a finer granular timer.

Hereinafter, the operation of the distributed packet processing apparatus 100 will be described in relation that PPM (Packets Per Minute) is used as a measure of the input processing load information and the output processing load information and each of the processing engines 130, 131, 132 and 133 counts its own packets, which are allocated to itself and a relevant field of the processing engine information table 140 is updated.

When the distributed packet processing apparatus 100 is initially operated, it is set such that the tag index is used as the processing engine index in the index conversion mapping table. Such an index conversion table may have a state shown in Table 1.

TABLE 1

| Output Packet Tag Index | Processing Engine Index |
|---|---|
| 0 | 0 |
| 1 | 1 |
| 2 | 2 |
| 3 | 3 |

In this case, it is assumed that the packet count of input packets for each tag index, which arrive for input processing in the distributed packet processing apparatus 100 for one minute, is shown in table 2.

TABLE 2

| Input Packet Tag Index | Input Packet Count |
|---|---|
| 0 | 100 |
| 1 | 20 |
| 2 | 200 |
| 3 | 50 |

It is assumed that the packet count of output packets for each tag index, which arrive for output processing in the distributed packet processing apparatus 100, is shown in table 3.

TABLE 3

| Output Packet Tag Index | Output Packet Count |
| --- | --- |
| 0 | 10 |
| 1 | 20 |
| 2 | 300 |
| 3 | 50 |

The input packet processing load information and the output packet processing load information, which are represented as the packet count of input packets and the packet count of output packets, respectively, that is, the information of Tables 2 and 3 may be updated every minute. Each processing engine may have counters, often implemented with hardware registers or FAU (Fetch and Add Unit), which increment the counter value whenever a packet is input. The counter counts the packets, and is reset when the processing engine information table 140 is updated at a period of one minute.

Since the tag index for the input packet is used as the processing engine index as it is, and the processing engine index to which the tag index of the output packet remains the same as the initial setting. That is, in the state that the tag index is identical to the processing engine index, the packet count of packets processed at each processing engine for one minute is shown in Table. 4.

TABLE 4

| Input/Output Packet Tag Index (=PE Index) | Input/Output Packet Count |
| --- | --- |
| 0 | 110 |
| 1 | 40 |
| 2 | 500 |
| 3 | 100 |

When the input packet processing load information and the output packet processing load information of the processing engine information table 140 are updated, the index conversion unit 150 checks the processing engine table 140 at every one minute to determine the load imbalance across the processing engines.

We may assume, in this example, that a processing engine is overloaded if 400 PPM or more load is imposed with, and hence the processing engine 2 is determined to be overloaded. Accordingly, the index conversion unit 150 determines to perform an index conversion mapping.

The packet counts of input packets for each processing index are listed in a descending order in Table 5.

TABLE 5

| PE index | Input Packet Count |
| --- | --- |
| 2 | 200 |
| 0 | 100 |
| 3 | 50 |
| 1 | 20 |

In addition, the packet counts of output packets for each processing index are listed in ascending power in Table 6.

TABLE 6

| PE index | Output Packet Count |
| --- | --- |
| 0 | 10 |
| 1 | 20 |
| 3 | 50 |
| 2 | 300 |

Accordingly, the index conversion unit 150 may generate index conversion mapping information shown in Table 7 by use of the information of Tables 5 and 6 such that to loads are maximally balanced.

TABLE 7

| Output Packet Tag Index | PE index |
| --- | --- |
| 0 | 2 |
| 1 | 0 |
| 3 | 3 |
| 2 | 1 |

It is assumed that the packet count of input packets arriving for input processing in the distributed packet processing apparatus 100 for one minute after the index conversion mapping is shown in table 8.

TABLE 8

| Input Packet Tag Index | Input Packet Count |
| --- | --- |
| 0 | 120 |
| 1 | 30 |
| 2 | 210 |
| 3 | 40 |

At this time, the packet count of output packets arriving for output processing in the distributed packet processing apparatus 100 is shown in table 9.

TABLE 9

| Output Packet Tag Index | Output Packet Count |
| --- | --- |
| 0 | 20 |
| 1 | 10 |
| 2 | 280 |
| 3 | 70 |

By calculating load for each processing engine based on the index conversion mapping information, the loads are distributed as shown in Table 10.

TABLE 10

| PE Index | Input Packet Count | Output Packet Count | Input/Output Packet Count |
| --- | --- | --- | --- |
| 0 | 120 | 10 | 130 |
| 1 | 30 | 280 | 310 |
| 2 | 210 | 20 | 230 |
| 3 | 40 | 70 | 110 |

When information of Table 10 is compared with information of Table 11, which shows loads of processing engines imposed when the index conversion is not converted, it is shown that the load distribution of Table 10 is more balanced than Table 11.

TABLE 11

| PE Index | Input Packet Count | Output Packet Count | Input/Output Packet Count |
| --- | --- | --- | --- |
| 0 | 120 | 20 | 140 |
| 1 | 30 | 10 | 40 |
| 2 | 210 | 280 | 490 |
| 3 | 40 | 70 | 110 |

Figure 3:
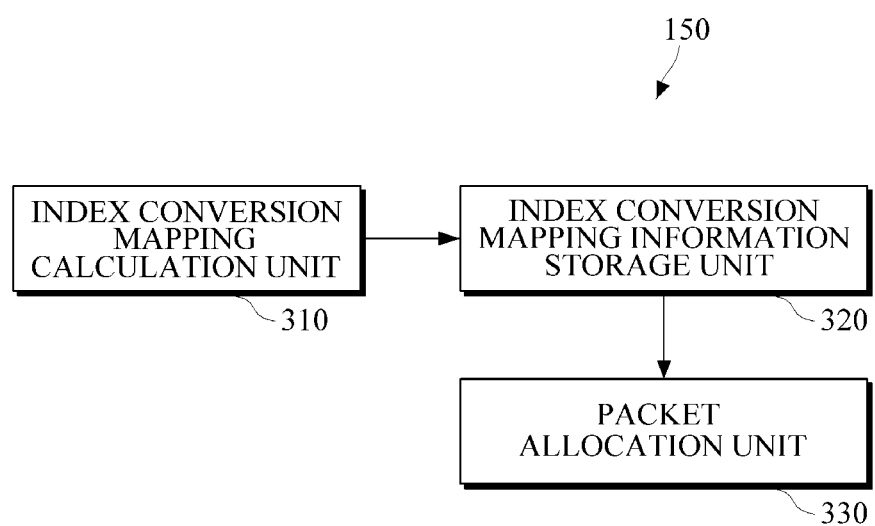
FIG. 3 illustrates an example of the configuration of an index conversion unit of FIG. 2.

For convenience of description, the sum of the packet counts of the input packets and the output packets is used as the load of the processing engines. However, the load of the processing engines may be measured in various ways. For example, if the input processing requires twice as much load as the output processing, the load of each processing engine may be calculated by use of a weighting scheme such that the packet count of an input packet is multiplied by a weight '2', for example, 2×(Input Packet Counts)+1×(Output Packet Counts)=Load of PE. This example may be suitably adopted when the data traffic has persistence in some degree, and a TCP (Transmission Control Protocol) traffic, which consist of often symmetric and bidirectional, is considered FIG. 3 illustrates an example of the configuration of an index conversion unit.

The index conversion unit 150 may include an index conversion mapping calculation unit 310, an index conversion mapping information storage unit 320 and a packet allocation unit 330.

The index conversion mapping calculation unit 310 calculates index conversion mapping information, which is used to convert the tag index for one of the input packet and the output packet to the processing engine index such that the loads are distributed among the plurality of processing engines 130, 131, 132 and 133, by referring to the processing engine information table 140 including the input packet processing load information and the output packet processing load information for each of the processing engines 130, 131, 132 and 133.

Figure 4:
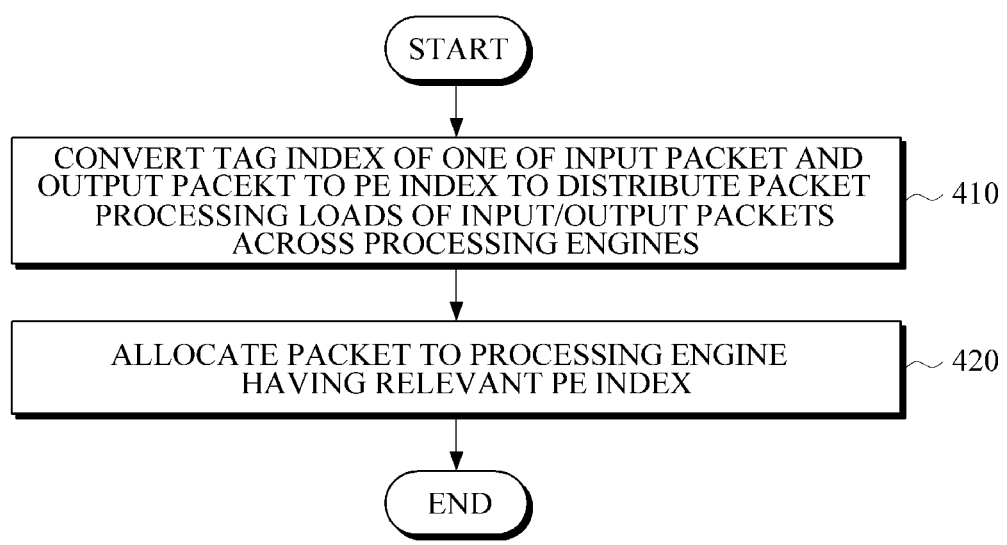
FIG. 4 illustrates an example of a distributed packet processing method.

The index conversion mapping information storage unit 320 may store index conversion mapping information according to the calculated index conversion information in the form of a table. For example, the index conversion mapping information may be formed using tag indexes of input packets, the tag index mapped to each of the processing engine indexes. For example, the index conversion mapping information may be formed using tag indexes of output packets, the tag index mapped to each of the processing engine indexes. In FIG. 4, the index conversion mapping information storage unit 320 is included in the index conversion unit 330. However, according to another example, the index conversion mapping information storage unit 320 may be included in other components of the distributed packet processing apparatus or may be stored in a separate memory.

When the processing engine information table 140 including the input packet processing load information and the output packet processing load information for each of the processing engines 130, 131, 132 and 133 is updated, the index conversion mapping calculation unit 310 may calculate load information for each of the processing engines by use of the input packet processing load information and the output packet processing load information that are included in the updated processing engine information table 140. If at least one of the processing engines has a load exceeding a predetermined threshold value, the index conversion mapping calculation unit 310 may newly calculate the index conversion mapping information, which represents information about converting a tag index of a packet to a processing engine index to which the corresponding packet is to be allocated. The index conversion mapping calculation unit 310 may store the calculated index conversion mapping information in the index conversion mapping information storage unit 320.

If the index conversion unit 150 is connected to an output packet processing path as shown in FIG. 1, the processing engines include N processing engines and an $i^{th}$ processing engine has a $j^{th}$ highest input packet processing load, the index conversion mapping calculation unit 310 performs an index conversion mapping such that the $i^{th}$ processing engine has a processing engine index corresponding to a N-$j^{th}$ highest output packet processing load. Meanwhile, if the index conversion unit 150 is connected to an input packet processing path, the processing engines include N processing engines and an $i^{th}$ processing engine has a $j^{th}$ highest output packet processing load, the index conversion mapping calculation unit 310 performs an index conversion mapping such that the $i^{th}$ processing engine has a processing engine index corresponding to a N-$j^{th}$ highest input packet processing load.

The packet allocation unit 330 converts one of the input packet and the output packet to a predetermined processing engine index according to the calculated index conversion mapping information, and allocates the corresponding packet to a processing engine having the predetermined processing engine index. The index conversion unit 150 and the packet allocation unit 130 may be provided in the form of a hardware crossbar switch to allocate packets according to the index conversion mapping.

FIG. 4 illustrates an example of a distributed packet processing method.

In order to perform distributed packet processing on input packets and output packets by use of a plurality of processing engines, a tag index for one of the input packet and the output packet is converted to a processing engine index such that processing loads of the input packets and the output packets are balanced across a plurality of processing engines (410). In converting a tag index for one of the input packet and the output packet to a processing engine index, index mapping conversion information, which includes information used to convert a tag index of one of the input packet and the output packet to a processing engine index, may be used.

One of the input packet and the output packet is allocated to a processing engine having the processing engine index (420).

Figure 5:
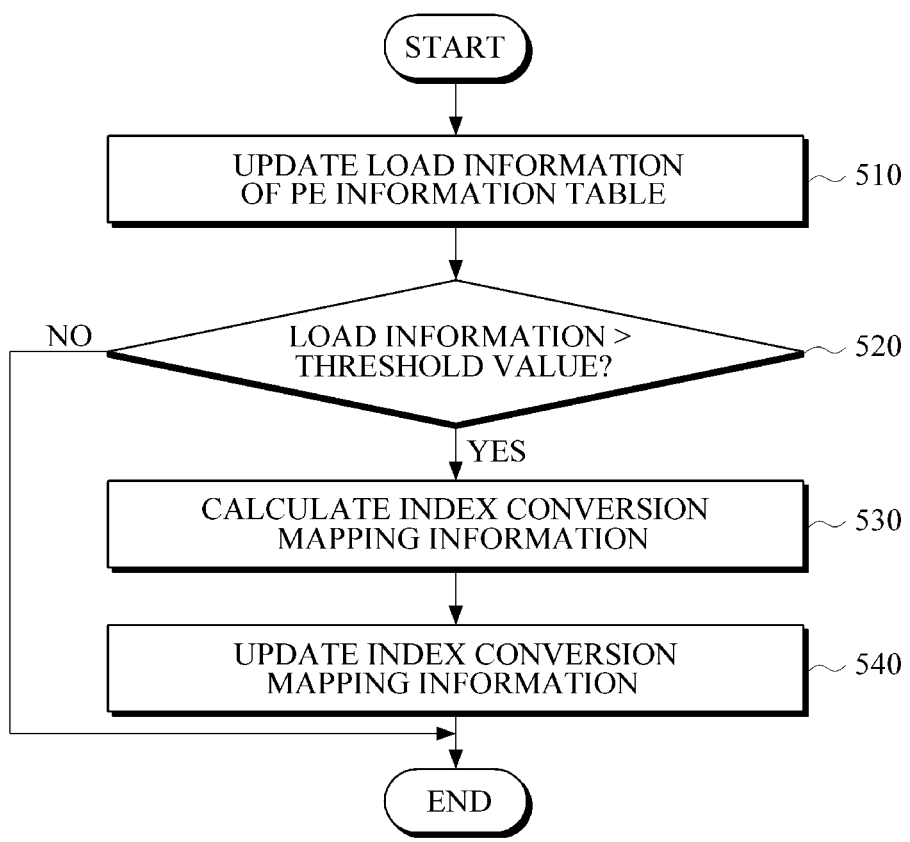
FIG. 5 illustrates an example of updating a processing engine information table.

FIG. 5 illustrates an example of updating the processing engine information table.

A processing engine information table including input packet processing load information and output packet processing load information for each of a plurality of processing engines is updated (510). It is determined whether at least one of the loads of the processing engines, which are calculated by use of the input packet processing load information and the output packet processing load information of the updated processing engine information table, exceeds a threshold value (520).

If at least one of the loads exceeds a predetermined threshold value (520), index conversion mapping information is calculated by referring to the updated engine information table (530).

The index conversion mapping table is updated by use of the calculated index conversion mapping information (540).

Thereafter, a tag index of one of the input packet and the output packet may be converted to a processing engine index according to index conversion mapping information of the updated index conversion mapping table, and the one of the input packet and the output packet is allocated to a processing engine having the processing engine index.

The example of a distributed packet processing method and an index conversion mapping table update method may be implemented in a network processor, an Application Specific Integrated Circuit (ASIC), and a Field-Programmable Gate Array (FPGA) in network devices such as routers.

Loadbalancing across a plurality of packet processing engines is performed in consideration of the heavy tailed flow size distribution, and the improved load balancing contributes to the increased aggregate bandwidth of the system.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A distributed packet processing apparatus comprising:
a plurality of processing engines each configured to process allocated packets;
a first tag generating unit configured to allocate an input packet to a processing engine, which has a processing engine index corresponding to a tag index for the input packet, among the plurality of processing engines;
a second tag generating unit configured to calculate a tag index for an output packet;
an index conversion unit configured to convert the tag index for the output packet to one processing engine index among a plurality of processing indexes for the plurality of the processing engines and allocates the output packet to a processing engine having the one processing engine index such that loads are distributed among the plurality of processing engines; and
a processing engine information table comprising input packet processing load information and output packet processing load information for each of the plurality of processing engines,
wherein the input packet and the output packet have different transmission directions and the input packet and the output packet are identified by their transmission directions,
wherein the index conversion unit calculates index conversion mapping information about mapping the tag index for the output packet to the processing engine index such that the loads are distributed among the plurality of processing engines by referring to the processing engine information table, and converts the tag index for the output packet to one of the plurality of processing engine indexes for the plurality of the processing engines by use of the calculated index conversion mapping information,
wherein the input packet is inputted from a network through an input port of the distributed packet processing apparatus, and the output packet is processed through the plurality of processing engines before outputting to the network through an output port of the distributed packet processing apparatus.

2. The distributed packet processing apparatus of claim 1, wherein the first tag generating unit measures input packet processing load for each of the plurality of processing engines and updates the input packet processing load information of the processing engine information table by use of information about the measured input packet processing load, and
the index conversion unit measures output packet processing load for each of the plurality of processing engines and updates the output packet processing load information of the processing engine information table by use of information about the measured output packet processing load.

3. The distributed packet processing apparatus of claim 2, wherein after the processing engine information table is updated, the index conversion unit changes the index conversion mapping information by referring to the updated processing engine information table such that the loads are distributed among the plurality of processing engines.

4. The distributed packet processing apparatus of claim 2, wherein after the processing engine information table is updated, the index conversion unit calculates load information for each of the processing engines by use of the input packet processing load information and the output packet processing load information that are included in the updated processing engine information table, and if at least one of the processing engines has load information exceeding a predetermined threshold value, the index conversion unit performs an index conversion mapping, which changes information about converting the tag index for the output packet to the processing engine index of the processing engine, by referring to the updated processing engine information table.

5. The distributed packet processing apparatus of claim 1, wherein when the plurality of processing engines comprise N processing engines and an ith processing engine has a jth highest input packet processing load, the index conversion unit performs an index conversion mapping such that a processing engine index of the ith processing engine has a N-j th highest output packet processing load.

6. A distributed packet processing apparatus comprising:
a plurality of processing engines each configured to process allocated packets;
a first tag generating unit configured to allocate an output packet to a processing engine, which has a processing engine index corresponding to a tag index for the output packet, among the plurality of processing engines;
a second tag generating unit configured to calculate a tag index for an input packet;
an index conversion unit configure to convert the tag index for the input packet to one processing engine index among a plurality of processing indexes for the plurality of the processing engines and allocates the input packet to a processing engine having the one processing engine index such that loads are distributed among the plurality of processing engines; and
a processing engine information table comprising input packet processing load information and output packet processing load information for each of the plurality of processing engines,
wherein the input packet and the output packet have different transmission directions and the input packet and the output packet are identified by their transmission directions,
wherein the index conversion unit calculates index conversion mapping information about mapping the tag index for the input packet to the processing engine index such that the loads are distributed among the plurality of processing engines by referring to the processing engine information table, and converts the tag index for the input packet to one of the plurality of processing indexes for the plurality of the processing engines by use of the calculated index conversion mapping information,
wherein the input packet is inputted from a network through an input port of the distributed packet processing apparatus, and the output packet is processed through the plurality of processing engines before outputting to the network through an output port of the distributed packet processing apparatus.

7. The distributed packet processing apparatus of claim 6, wherein the first tag generating unit measure output packet processing load for each of the plurality of processing engines and updates the output packet processing load information of the processing engine information table by use of information about the measured output packet processing load, and
the index conversion unit measures input packet processing load for each of the plurality of processing engines and updates the input packet processing load information of the processing engine information table by use of information about the measured input packet processing load.

8. The distributed packet processing apparatus of claim 7, wherein after the processing engine information table is updated, the index conversion unit performs index conversion mapping, which changes the index conversion mapping information, by referring to the updated processing engine information table.

9. The distributed packet processing apparatus of claim 7, wherein after the processing engine information table is updated, the index conversion unit calculates load information for each of the processing engines by use of the input packet processing load information and the output packet processing load information that are included in the updated processing engine information table, and if at least one of the processing engines has load information exceeding a predetermined threshold value, the index conversion unit performs an index conversion mapping, which changes the index conversion mapping information, by referring to the updated processing engine table information.

10. The distributed packet processing apparatus of claim 6, wherein if the plurality of processing engines comprise N processing engines and an ith processing engine has a jth highest output packet processing load, the index conversion unit performs an index conversion mapping such that a processing engine index of the ith processing engine has a N-j th highest input packet processing load.

11. A distributed packet processing method for performing a distributed processing on input packets and output packets by use of a plurality of processing engines, the method comprising:
converting a tag index for one of the input packet and the output packet to one processing engine index among a plurality of processing indexes for the plurality of the processing engines such that loads are distributed among the plurality of processing engines; and
allocating the one of the input packet and the output packet to a processing engine having the one processing engine index,
calculating index conversion mapping information about mapping the tag index for the input packet to the processing engine index such that the loads are distributed among the plurality of processing engines by referring to a processing engine information table comprising input packet processing load information and output packet processing load information for each of the plurality of processing engines, and converting the tag index for the input packet to one of the plurality of processing indexes for the plurality of the processing engines by use of the calculated index conversion mapping information,
wherein the input packet and the output packet have different transmission directions and the input packet and the output packet are identified by their transmission directions,
wherein the converting calculates index conversion mapping information about mapping the tag index for the output packet to the processing engine index such that the loads are distributed among the plurality of processing engines by referring to the processing engine information table, and converts the tag index for the output packet to one of the plurality of processing indexes for the plurality of the processing engines by use of the calculated index conversion mapping information,
wherein the input packet is inputted from a network through an input port of the distributed packet processing apparatus, and the output packet is processed through the plurality of processing engines before outputting to the network through an output port of the distributed packet processing apparatus.

12. The method of claim 11, further comprising:
updating a processing engine information table comprising input packet processing load information and output packet processing load information for each of the plurality of processing engines.

13. The method of claim 12, further comprising:
after the processing engine information table is updated, calculating load information for each of the processing engines by use of the input packet processing load information and the output packet processing load information that are included in the updated processing engine information table; and
if at least one of the processing engines has load information exceeding a predetermined threshold value, updating index conversion mapping information, which is used to convert a tag index for one of the input packet and the output packet to one of processing engine indexes; and
converting a tag index for one of the input packet and the output packet to one of the plurality of processing engine indexes for the plurality of processing engines by use of the updated index conversion mapping information.

14. The method of claim 13, wherein the updating of the index conversion mapping information further comprises, if the plurality of processing engines comprise N processing engines and an ith processing engine has a jth highest input packet processing load, updating the index conversion mapping information such that a processing engine index of the ith processing engine has a N-j th highest output packet processing load.

15. A distributed packet processing apparatus comprising:
an index conversion mapping calculation unit configured to calculate index conversion mapping information, which is used to convert a tag index for an input packet to one of a plurality of processing engine indexes for a plurality of processing engines and a tag index for an output packet to one of a plurality of processing engine indexes for a plurality of processing engines, by referring to a processing engine information table including input packet processing load information and output packet processing load information for each of the plurality of processing engine such that loads are distributed among the plurality of processing engines; and
a packet allocation unit configured to convert a tag index for the input packet to a processing engine index of the plurality of processing engine indexes and a tag index for the output packet to a processing engine index of the plurality of processing engine indexes according to the calculated index conversion mapping information, and allocate the input packet and the output packet to a processing engine having the converted processing engine index for the input packet and the output packet,
wherein the input packet and the output packet have different transmission directions and the input packet and the output packet are identified by their transmission directions,
wherein the input packet is inputted from a network through an input port of the distributed packet processing apparatus, and the output packet is processed through the plurality of processing engines before outputting to the network through an output port of the distributed packet processing apparatus.

16. The distributed packet processing apparatus of claim 15, further comprising an index conversion mapping table that stores the index conversion mapping information.

17. The distributed packet processing apparatus of claim 15, wherein if the processing engine information table including input packet processing load information and output packet processing load information for each of the plurality of processing engine is updated, the index conversion mapping calculation unit calculates load information for each of the processing engines by use of the input packet processing load information and the output packet processing load information that are included in the updated processing engine information table, and recalculates the index conversion mapping information if at least one of the processing engines has load information exceeding a predetermined threshold value.

18. The distributed packet processing apparatus of claim 15, wherein if the plurality of processing engines comprise N processes engines and an ith processing engine corresponds to a first packet having a jth highest first packet processing load, the index conversion mapping calculation unit calculates the index conversion mapping information such that a processing engine index of the ith processing engine has a second packet having a N-j th highest second packet processing load, and wherein if the first packet is an input packet, the second packet is an output packet, and if the first packet is an output packet, the second packet is an input packet.

* * * * *